United States Patent [19]
Takei

[11] 3,816,216
[45] June 11, 1974

[54] METHOD AND APPARATUS FOR JOINING AND CUTTING SHEET MATERIALS

[75] Inventor: Masuya Takei, Osaka, Japan
[73] Assignee: Kuraray Co., Ltd., Osaka, Japan
[22] Filed: Jan. 21, 1972
[21] Appl. No.: 219,784

[52] U.S. Cl.............. 156/380, 100/269 R, 156/515, 156/583
[51] Int. Cl......................... B29c 19/02, B30b 1/34
[58] Field of Search .......... 156/380, 583, 251, 515; 100/269 R

[56] References Cited
UNITED STATES PATENTS
| | | | |
|---|---|---|---|
| 512,790 | 1/1894 | Bachman | 100/269 R |
| 1,307,586 | 6/1919 | Kochendorfer | 100/269 R |
| 1,930,155 | 10/1933 | Wiedmann | 100/269 R |
| 2,580,075 | 12/1951 | Clark et al. | 156/380 |

Primary Examiner—Douglas J. Drummond

[57] ABSTRACT

A method of working thermoplastic sheet materials employs a pair of high frequency electrodes for heating the materials, one of the electrodes having a cutting edge which is lightly applied during the heating operation to bond the sheets together, after which force is applied to sever the sheets by means of the cutting edge. Apparatus is disclosed comprising a pair of rams operative in one direction to press the pair of electrodes together initially under light force, then under pressure stored up in a compression spring and finally to sever the sheets by means of pressure exerted by one of the rams.

5 Claims, 5 Drawing Figures

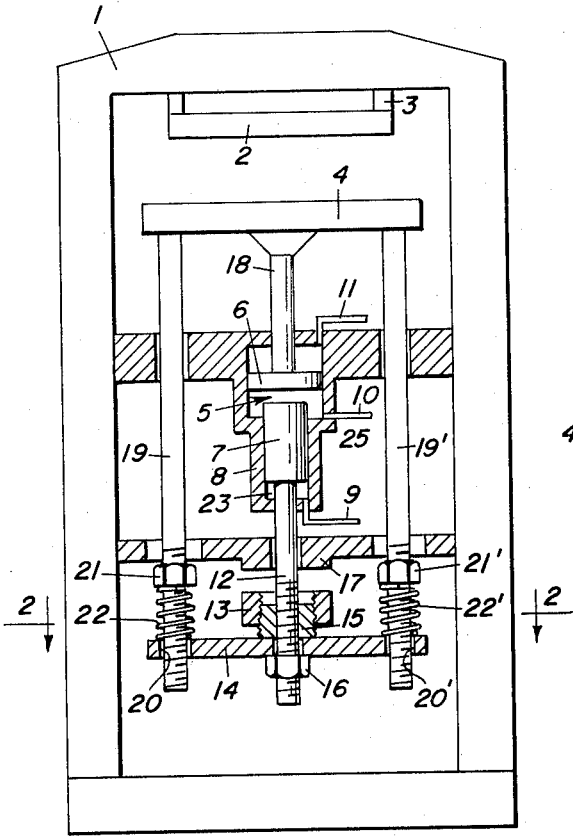
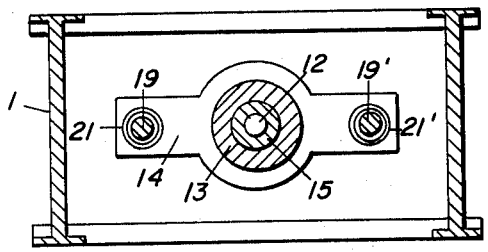
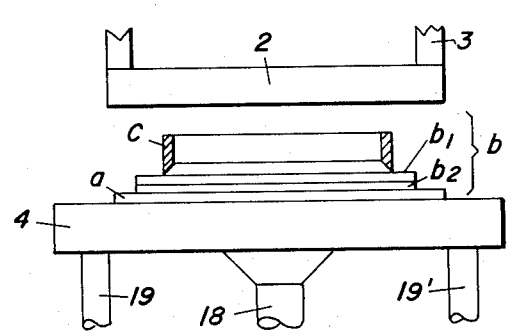
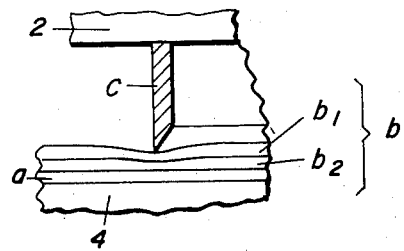
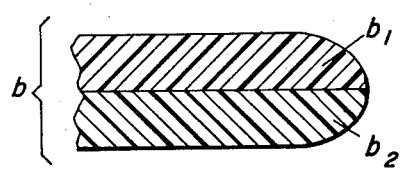

METHOD AND APPARATUS FOR JOINING AND CUTTING SHEET MATERIALS

This invention relates to a method and device for high-frequency working of sheet materials by placing the sheet materials made of thermoplastic polymer, for example, pieces of artificial leather of the same kind one over the other or placing a piece of artificial leather and a piece of lining capable of high-frequency welding one over the other.

In manufacture of shoes or trunks or bags out of a sheet material, namely an artificial leather, said sheet artificial leather being made of a fibrous base body such as woven or nonwoven cloth or one impregnated with polyurethane elastomer or the like and of a coating layer as of polyurethane elastomer covering the surface of said base body, is employed a method similar to that of working natural leather, said method including cutting in the first place artificial leather into a suitable size, reducing the edge of the leather in thickness to make the edge pliable, applying an adhesive such as rubber cement to the reduced portion, turning in the reduced edge by folding machine or by hand and adhering temporarily, and finally sewing the edge by machine.

But the method of the kind described offers the disadvantage that working according to the method not only takes much trouble but also makes it difficult to form a folded portion small in radius of curvature because artificial leather is greater in repellency than natural leather, with the result that the products of artificial leather cannot stand comparison in outer appearance with that of natural leather, which, in turn, decreases the commercial value of the products.

Furthermore, along other methods of working artificial leather may be a method in which, like the one conventionally used in working vinyl chloride leather, a piece of artificial leather and a piece of lining capable of high-frequency welding are laid one over the other, welded into a required form by use of a high-frequency welder, and is cut immediately thereafter, but this method cannot provide such a soft and roundish cut surface as can be obtained by tucking in of the edge of the sheet material by folding machine.

An object of the present invention is to provide a high-frequency working method and a device for carrying out the method which provides such a soft and roundish cut surface as can be provided by tucking in of the edge of a cut sheet material when so-called high-frequency working is effected in which pieces of artificial leather of the same kind or a piece of artificial leather and a piece of lining capable of high-frequency working are placed one over the other, the two pieces thus put together are welded by applying high-frequency current and are cut immediately near the welded portion.

However, the method and device provided by the invention can find application also in the high-frequency working of sheet materials of thermoplastic polymer between themselves, such as polyurethane, polyethylene, polyvinyl chloride, or the like, and includes accordingly a method and device for use in working such materials.

To put it briefly, the present invention provides a method and a device, said method comprising, in rapid sequential combination, a step of causing an electrode capable of high-frequency welding and cutting to lightly bite the sheet materials laid one over the other, a step of applying a high-frequency current to the electrode with the electrode lightly biting the materials, heating and welding the materials and cutting off of the current, a step of causing the edge of the electrode to bite the materials deeper in proportion to the heating preferably in the afore-stated state and cutting off the current in the state thus brought about, a step of cutting the sheet materials jointed in the afore-mentioned step by applying high pressure to the electrode immediately after the current has been cut off, and said device being a device in which a ram for moving a movable electrode plate are divided into an upper and lower ram so as to enable simple and positive application of said method.

A description will now be made of the invention with reference to the accompanying drawings showing by way of example the device of the invention in a preferred form; a description of the method, however, will be made with the progress of explanation of the structure and operation of the device.

For ready understanding of the structure of the device of the invention, the drawings are in part simplified in a schematic form and an oil pressure unit, discharge regulator, accumulator and piping as well as a control board and high-frequency oscillator that constitute the essential attachments of the device of the invention are omitted.

BRIEF DESCRIPTION OF THE DRAWINGS

FIGS. 1 and 2 are views explaining the device of the present invention in which FIG. 1 is an elevation schematically illustrating, in section, the essential parts of the device of the invention shown by way of example and in which FIG. 2 is a section taken along the line A— A of FIG. 1;

FIGS. 3 and 4 are schematic diagrams respectively for explaining the high-frequency working according to the device of the invention; and FIG. 5 is a sectional view showing the section of the welded portion of the sheet materials welded by high-frequency working.

Referring now to the structure of the device in conjunction with the embodiment shown in FIGS. 1 and 2, the numeral 1 designates a main body frame and 2 designates an upper electrode plate. The upper electrode plate 2 is a fixed electrode plate, which is fixed to the main body frame 1 through an insulating material 3 such as Bakelite. The numeral 4 designates a lower electrode plate, which is movable and fixed to the upper end of a ram 5.

In the embodiment illustrated, the lower electrode plate 4 is designed to move, but it should be understood that the upper electrode might be designed to move. However, it should be pointed out that it can produce a better result to move the lower electrode plate 4 than to move the upper electrode plate 2 because moving of the lower electrode plate 4 is placed under less effect of dead weight of the ram than moving of the upper electrode plate 2. Furthermore, if a degree of mechanical parallelism between the upper electrode plate and the lower electrode plate is higher in precision, it is desirable to that extent.

In order to operate high-frequency welding cutting providing a soft roundish cut surface similar to that of tucking in of the edge shown in FIG. 5, it is necessary, in the first place, to uniformalize high-frequency heating conditions of each part, and accordingly it is important to precisely provide a degree of parallelism of the upper and lower electrode plates of the high-frequency welder and a degree of horizontality of electrode, an error in said parallelism and horizontality preferably being less than 0.1 mm in the case of the electrode plates being 50 cm × 50 cm in size. When the degree of parallelism is not precisely provided, a difference arises in high-frequency heating and such difference makes it difficult to obtain a uniform cut surface similar to the tucking in of the edge. Also, it is important that an electrode having an edge of a relatively small angle be used in the cutter blade. This angle of edge may vary in accordance with the thickness of the artificial leather and lining subjected to high-frequency welding cutting, and an angle of below 70°, preferably 20° – 45°, is suitable, and if the angle of edge is too large, it is difficult to obtain a roundish surface because the artificial leather and lining are strongly pressed by the electrode during high-frequency heating.

The ram 5 is divided into two parts consisting of an upper ram 6 and lower ram 7 disposed in upper and lower positions, respectively. Pressure oil pipes 9, 10 and 11 are connected to a cylinder 8 at the lower end, middle part, and upper end. Accordingly, the upper ram 6 is not only enabled to move upward under the thrust of the lower ram 7 that moves upward by oil under pressure from the oil pipe 9, but is also enabled to move up and down even by itself with the aid of oil under pressure from pipes 10 and 11.

The lower portion of the lower ram 7 constitutes a lower rod 12, which projects downwardly from the cylinder 8. A stopper 13 and a support plate 14 for limiting the stroke of the lower ram 7 are fixed to the lower rod 12 by clamping nuts 15 and 16. The stopper 13 is threadedly fitted over the clamping nut 15 in such a manner as to permit fine upward and downward movement. The stroke of the lower ram is limited by the lower rod 12 moving upward and the stopper 13 striking a stopper 17 forming part of the main body frame. As described later on, the device of the invention is enabled by this mechanism to accurately control the biting position the edge of the electrode takes before energization of the electrode.

The upper portion of the upper ram 6 constitutes an upper rod 18 and projects upwardly from the cylinder 8. As described previously, the lower electrode plate 4 is fixed to the upper end of the upper ram 6, namely the upper end of the upper rod 8. The lower electrode plate 4 is provided bilaterally on the underside with rods 19 and 19' each depending in parallel to the ram 5, the ends of said rods passing through holes 20 and 20' on the right and left sides of the support plate 14. The rods 19 and 19' are provided at the lower portions with adjusting nuts 21 and 21', and coil springs 22 and 22' are held between the adjusting nuts 21, 21' and the support plate 14. The coil springs 22 and 22' are compressed by the support plate 14 that moves upward together with the lower ram 7 when the lower ram 7 moves upward until it contacts the upper ram 6, and the amount of compression is adjusted by the adjusting nuts 21 and 21'. Now a description will be made hereinbelow of the operation of the device of the invention, namely the steps of high-frequency working according to the device of the invention.

As shown in FIG. 3, the device is set in the manner that an electric insulating plate $a$ such as a Bakelite plate is placed on the lower electrode plate 4, the sheet material $b$ to be subjected to high-frequency working, for example a piece of artificial leather $b_1$ and a piece of lining $b_2$ are placed on said insulating plate $a$, and further an electrode C is placed on said sheet materials $b$.

Next, the lower ram 7 is pushed upward by feeding oil under pressure from the oil pipe 9 to the lower side of the lower ram, namely the lower portion 23 of the cylinder 8 and applying pressure thereto. Elevation of the lower ram 7 causes the head of the lower ram 7 to strike the bottom of the upper ram 6, during which time coil springs 22 and 22' are compressed between the adjusting nuts 21, 21' and the fitting plate 14. Compression of the coil springs 22 and 22' is positively effected by supplying the upper side of the upper ram 6, namely the upper portion 24 of the cylinder 8 with oil under pressure from the oil pipe 11, in other words, by applying back pressure to the upper ram 6. Namely, the upper ram 6 is not moved upward before the coil springs 22 and 22' are compressed and the upper ram 6 is brought into contact with the lower ram 7. After the lower ram 7 has been brought into contact with the upper ram 6, the upper ram 6, and hence the lower electrode plate 4, is pushed upward. It is to be understood that the back pressure applied to the upper portion 24 of the cylinder 8 should be such as will not prevent the upward movement of the lower and upper rams 7 and 6.

In the manner described, the coil springs 22 and 22' are compressed and the upper and lower rams 6 and 7 are pushed upward in the state of both rams being kept in contact. When the lower ram 7 is moved to the uppermost position, the position of the stopper 13 with respect to the stop plate 17 is adjusted so that the edge of the cutter blade C may be brought into the state of biting the sheet materials $b$ slightly, and accordingly, the upper end of the cutter blade C which concurrently functions as an electrode bears against the upper electrode plate 2, the edge of the cutter blade C applies pressure to the sheet materials $b$ and is brought into the state of the edge slightly biting the sheet materials. In the state described above, high-frequency current flows between the upper electrode 2 and the lower electrode 4 and exposes the sheet materials $b$ to high-frequency heating. The amount of biting the cutter blade provides at this time is so controlled as to bite the sheet materials $b$ gradually deeper by decreasing the amount of biting at the time of high-frequency heating was started and by increasing the same accordingly as heating is increased. This operation is effected by utilizing the resilience of the coil springs 22 and 22'. Namely, the resilience of the coil springs 22 and 22' is transmitted from the rods 19 and 19' to the lower electrode plate 4 by discharging the oil under pressure poured into the upper side of the upper ram 6, i.e., the upper portion 24 of the cylinder 8, while adjusting the discharge regulating valve (not shown). In this operation it is important, as described earlier, that the pressure of the electrode applied to the artificial leather and lining during high-frequency heating be decreased. When the pressure is too high, the sheet materials $b$ are pressed by the electrode and are damaged on the welding cut portion, and it becomes difficult to obtain a roundish cut surface. On the other hand, unless the electrode is caused to bite the sheet materials $b$ considerably deeply at the end of heating, the coating layer does not cover the cut surface sufficiently and hence it is impossible to obtain a processed article of high commercial value. Accordingly, although it is not necessary to do so when the sheet materials $b$ are thick, it is generally desirable to make the biting of the electrode slight at the initial stage of heating, make the electrode cut deeper into the sheet materials $b$ in proportion as heating is increased, decrease the pressure given to the sheet materials $b$ and yet to make the electrode bite the sheet materials $b$ sufficiently at the end of high-frequency heating. The amount of biting of the electrode prior to heating varies in accordance with the thickness and repellency and the like of a sheet material, but the amount is suitable in the range of 0.2 - 1.5 mm. The velocity and amount of biting of the electrode during heating also vary depending upon the thickness and repellency and the like of a sheet material, but if it is suitable that they lie in the range of 0 - 0.5 mm/sec and are on the order of one-half of the total thickness of the right and back side materials when the right and back side materials are in the range of 2 - 3 mm in total thickness. It is important that the above-mentioned amount and velocity of biting be regulated to a fixed value in accordance with the kind of combination of the right side material and the back side material.

Upon completion of the high-frequency heating, the sheet materials $b$ are cut at high speed with the cutter blade C by quickly elevating the lower electrode plate 4 and supplying oil under pressure from the oil pipe 10 to the underside portion of the upper ram, i.e., the middle portion 25 of the cylinder 8 through an accumulator (not shown).

When the sheet materials $b$ are cut at high speed immediately after the high-frequency heating was over, because the right side material is strongly stretched and holds repellency and because the back side material is sufficiently heated and holds plasticity, there is produced deformation in the sheet material after cutting, to thereby make it possible to obtain a cut surface having a roundish soft surface similar to that provided by tucking in of the edge. When the cutting is over, the upper ram 6 and the lower ram 7 are lowered, whereupon the high-frequency working is completed.

As will be understood from the description so far made, it is imporatnt in the invention that the amount of biting of the electrode prior to heating and the velocity and amount of biting of the electrode provided during heating be regulating. The relative degree of such velocity and amount, because it changes the repellency of the right side material and the plasticity of the back side material, has a decisive effect upon the contraction and deformation necessary for the production of a soft roundish cut surface similar to that provided by tucking in of the edge of the sheet materials. Also, no less important is the fact that cutting must be done at high speed. If the speed of cutting is slow, the cut surface becomes hard and sharp-pointed.

The device of the invention makes it possible to meet all the described requirements with ease. A primary feature of the device resides in the fact that the ram for moving the movable electrode plates is divided into two upper and lower rams.

Another feature of the invention device lies in the fact that there is provided a stopper for limiting the elevation of the ram that operates earlier so that the amount of biting of the cutter blade given at the starting of high-frequency current flowing, in other words, that space between the edge of the cutter blade C and the lower electrode plate which must be varied in accordance with the kind and thickness of a material to be subjected to high-frequency working may be optionally set uniform and that there is a screw mechanism which permits fine adjustment of said stopper.

Still another feature of the device is that the operation of the ram during high-frequency working is carried out by the separate force obtained by using oil pressure as auxiliary force so that the cutter blade may gradually increase the amount of biting it gives to the sheet materials at the start of high-frequency heating and also so that the speed at which said cutter blade bites the sheet materials may be regulated finely depending upon the quality and thickness of the sheet materials. Namely, the ram that operates later is operated by using as main force the resilience of the springs compressed by the ram that operates earlier and by using as auxiliary force the negative oil pressure (back pressure) applied against said main force and by removing said auxiliary force while regulating the auxiliary force through the discharge regulating valve.

Yet further feature of the device is that the upper ram is designed to function independently so that speedy cutting may be effected in the step of cutting.

What is claimed is:

1. Apparatus for working sheets of thermoplastic sheet materials comprising a pair of high frequency electrode plates, press means for supporting said plates for reciprocatory movement toward and away from each other, said press means including a cylinder and first and second pistons slidable in said cylinder at opposite ends thereof, means to supply working fluid to the interior of said cylinder at the respective ends thereof and also between said pistons for selectively reciprocating each of said pistons, means for directly connecting said first piston with one of said plates for reciprocating movement of said one plate, means for yieldingly connecting said second piston with said one plate for yieldingly urging movement of said one plate towards the other of said plates.

2. The invention defined in claim 1, wherein said second piston is movable into axial abutment with said first piston while yieldingly urging said movement of said one plate.

3. The invention defined in claim 1, wherein said means for yieldingly connecting the second piston with the plate includes compression spring means.

4. The invention defined in claim 1, wherein said means for yieldingly connecting the second piston with the plate includes adjustable stopper means for limiting movement of the second piston in the direction for urging said one plate toward the other plate, whereby the amount of force exerted by said second piston may be limited.

5. The invention defined in claim 1, wherein the area of said first piston in contact with the supply of working fluid between said pistons is substantially greater than the area of the second piston in contact with fluid between the pistons.

* * * * *